United States Patent [19]

Retz

[11] Patent Number: 4,686,376

[45] Date of Patent: Aug. 11, 1987

[54] TIDE TURBINE

[76] Inventor: Philip Retz, 1783 Lanier Pl. NW., Washington, D.C. 20009

[21] Appl. No.: 888,065

[22] Filed: Jul. 22, 1986

[51] Int. Cl.⁴ ............................................. F03D 3/04
[52] U.S. Cl. ..................................... 290/42; 290/43; 290/54; 415/2 R
[58] Field of Search ...................... 290/43, 42, 53, 54; 416/197 R, 197 A, 199, 184; 415/2 R, 3 R, 4 R

[56] References Cited

U.S. PATENT DOCUMENTS

| 54,123 | 4/1866 | Cushman | 416/197 |
|---|---|---|---|
| 2,287,853 | 6/1942 | Allardice | 416/184 |
| 3,147,957 | 9/1964 | Martin | 416/199 X |
| 4,322,200 | 3/1982 | Stiegelmeier | 416/184 |
| 4,433,544 | 2/1984 | Wells et al. | 415/2 R X |
| 4,457,666 | 7/1984 | Selman, Jr. | 415/2 R |

OTHER PUBLICATIONS

Andre, H., "Cheap Electricity from French Tides", IEEE Spectrum, 1980 pp. 54-57.

*Primary Examiner*—William M. Shoop, Jr.
*Assistant Examiner*—Sharon D. Logan
*Attorney, Agent, or Firm*—Saidman, Sterne, Kessler & Goldstein

[57] ABSTRACT

An improved turbine and generating system for generating electrical power from the energy of flowing water, such as a tide, in a water course are disclosed. The turbine features peripheral inward flow and axial outward flow. A flow divider means is provided to ensure that the outward flow is substantially uniform along the turbine shaft in both directions. The turbine wheel is made up of radially extending scoops and generally circular disks, to define chambers. Preferably the chambers are of continuously decreasing cross-sectional area, measured perpendicular to water flow therethrough. Baffles may be provided preventing water from entering certain of the chambers formed between the scoops and disks of the turbine to ensure that a net rotational impetus is given to the turbine by water flow thereagainst. The structure supporting the turbines and generators in and above the watercourse may include a causeway for vehicular traffic.

24 Claims, 14 Drawing Figures

TIDE TURBINE

BACKGROUND OF THE INVENTION

1. Field of the Invention

This invention relates to turbines for generating electric power. More particularly, this invention relates to turbines for generating electrical power which are driven by the force of the tides.

2. Description of the Related Art

For many years, men have sought a way to harness efficiently the power in ocean and river currents, and in the tides, which are governed by gravitational forces and are thus not subject to consumption by combustion as in the case of petroleum, coal and other natural resources. Numerous schemes, have been developed to harness the power in tidal waters and in ocean or river currents, but for a variety of reasons, none of these has been truly successful. For example, U.S. Pat. Nos. 3,604,942 to Nelson, 3,912,937 to Lesser, 3,922,012 to Herz, and 3,927,330 to Skorupinski all show systems for underwater turbines which involve blades that collapse when they are being dragged against the current and are supposed to open up again when disposed favorably with respect to the current, so that a net torque is produced, which can be used to drive a generator. These systems are all relatively complex, and it appears unlikely that they will be reliable for any great length of time, especially considering the harsh underwater environment of the ocean, which is not only corrosive but, of course, is also home to a wide variety of barnacles, kelp weeds and the like which attach themselves to mechanical parts and would, over time, tend to render them inoperable.

Other systems concerned with obtaining power from current or tidal flows include the devices shown in U.S. Pat. Nos. 4,095,422 to Kurakake (a system having very complex arrangement of a number of paddle wheels), 4,292,535 to Diggs (a complex system involving a number of swinging blades, for converting water power into electricity), and 4,023,041 to Chappell (a water-powered generator that floats up and down with the water level and rotates in response to changes in tide or current flow). All the systems shown in these patents are very complex, involving a large number of moving parts, and would be costly to manufacture and would appear unlikely to be reliable in operation.

Other patents which show water powered devices that may be of some historical significance, but which do not adequately solve the problem of obtaining suitable useful power from tides are U.S. Pat. Nos. 204,728 to Haskins; 958,467 to Bennett; and 1,320,650 to Pratt.

Many of the designs shown in the patents referred to above involve disposition of electrical generation equipment below the water line, which raises a host of difficulties. Similarly, many of these designs would tend to macerate fish swimming into them, no escape route for fish being provided.

More recently, in an article in *Popular Science*, Vol. 226, No. 1 (Jan. 1985), pp. 56 et seq., there was described a proposed system for obtaining electrical power from the tides. In this system, a tunnel was to be dug along a waterway having a high degree of tidal activity, such as in the Bay of Fundy. The tides are constrained to pass through the tunnel. Water is stored in a pond during the incoming tide and used to generate power on the outgoing tide only, although generation in both modes would be possible. A turbine is mounted for rotation within the tunnel, and is driven by water passing therethrough. The stator of a circular generator is disposed around the turbine in the wall of the tunnel and the rotor of the generator is affixed to the outer extremities of the blades of the turbine. This system appears, according to the *Popular Science* article, to have some utility. On the other hand, the turbine design employed places the electrical generation equipment in and closely surrounding the tunnel through which the water flows. This can be expected at best to pose maintenance difficulties, and is a serious constraint on the design of the generator. Furthermore, and as detailed in the article, many unpredictable environmental changes caused by the variation of the tides will inevitably occur if a project of this type having power generating capacity sufficient to justify its cost is constructed. Governmental approval may therefore not be possible, if the environmental impact appears likely to outweigh the benefits of the power provided.

Also discussed in the *Popular Science* article is a French project on the Rance River in which generators are disposed in bulbs disposed in the water stream, coaxial with the turbines which drive them. Apparently, this system has been in operation for some time, but the apparatus is quite expensive, as compared to that which is the primary subject of the article. The Rance River project also has had substantial environmental impact in that it relies upon variation of the natural tides for steady power, and suffers from many of the same design and maintenance problems.

The most desirable location for a tide driven turbine generation system would clearly be an oceanic area in which a large number of consumers of electric power are located in juxtaposition to an area having relatively large tidal variation. Such an area is the northeastern portion of the United States, where the population density is high, running from Washington, D. C. to Boston and beyond, and where the tides are also quite high. Several good spots are found along the coast of Maine and between Maine and Nova Scotia, in particular between Maine and Grand Manan Island which is nine miles off the coast of Maine. The tides in the channel between them, which is up to some 300 feet deep, run at up to approximately 3.4 mph with a normal variation of approximately 20–26 feet.

It will be appreciated by those skilled in the art that a supporting structure will be necessary to locate turbines and generators directly in and above the water respectively. It would be desirable to use such a structure for other purposes as well, e.g., as a causeway for vehicular traffic between the mainland and an island or other land mass between which the tides are relatively high. In this way, maximum utility could be provided by the tidal generation system according to the invention.

OBJECTS OF THE INVENTION

It is therefore an object of the invention to provide a water driven turbine which will generate electric power from tidal movement.

It is a further object to provide a tidal generator which will provide substantial power generation capability without materially affecting the natural flow of the tides, so as to avoid adverse environmental impact.

It is a further object of the invention to provide an electrical power generation system which employs the tides for driving generators, in which the electrical generation mechanism is disposed above the high water mark and is mechanically connected to turbines disposed at all times beneath the surface of the water.

It is a further object of the invention to provide a water-driven turbine which allows reasonably free passage of fish and other aquatic life.

It is a further object of the invention to provide a turbine which will generate useful electric power from the tides of the ocean, which is relatively simple to install, inexpensive to construct, durable in service, and not overly susceptible to fouling by marine organisms or the like.

It is a further object of the invention to provide an improved turbine generating system.

It is a further object of the invention to provide a tidal turbine generation system in which the structure used to support the turbines and generating machinery are also used to provide a causeway, thereby opening up hitherto inaccessible areas to vehicular traffic.

SUMMARY OF THE INVENTION

The above needs of the art and objects of the invention are met by the present invention, which comprises an improved water turbine and generating system employing the same. The turbine of the invention comprises at least one rotor unit, which is generally toroidal in cross-section. Each turbine rotor unit is made up of a number of generally radial scoops, upper and lower generally circular disks having axial openings, which together with the scoops define chambers having circumferential inlets and axial outlets, and a diverter center hub. Water thus enters the turbine from its periphery and exits along the axis. The diverter hub splits the flow of water to flow axially along the shaft of the turbine in either direction, such that no net axial force is exerted on the turbine by the exiting water. Baffles are provided to shroud essentially one-third of the surface of the blades which are exposed to the incoming current, such that a net rotational force is exerted on the turbine by water flow against the uncovered blades on the side of the turbine which is exposed to the incoming water, and to increase the flow of water against the exposed side of the blades. Similar baffles may be provided on the other side of the turbine, so that power is generated during tidal flow in both directions.

The turbine of the invention may be used in an array, so as to be useful in connection with a wide range of depths, and may be disposed in a channel having a relatively constant flow of water therethrough.

In a particularly preferred embodiment, a number of tidal turbines are disposed beneath a causeway extending between different land masses, so as to render accessible previously inaccessible areas. A number of the turbines of the invention are connected by a common shaft which drives a generator.

BRIEF DESCRIPTION OF THE DRAWINGS

Additional objects, features, and advantages of the present invention will become more readily apparent as the invention becomes more fully understood from the following detailed description of the invention considered in connection with the accompanying drawings, wherein.

DETAILED DESCRIPTION OF THE PREFERRED EMBODIMENTS

Figure 1A:
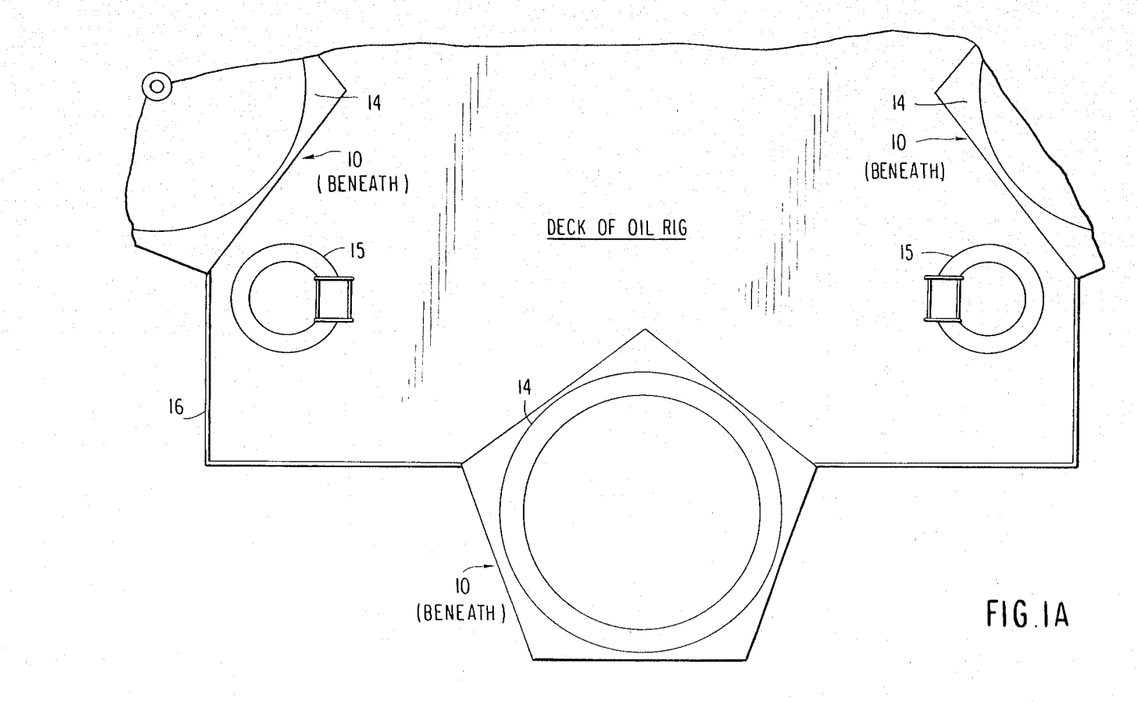
FIG. 1A is a plan view of a first embodiment of the tide turbine of the present invention, shown as it might be used beneath an oil drilling platform.

Tide turbines incorporating the principles and concepts of the present invention which may take the form of any of several possible embodiments are referred to in the accompanying drawings by the reference numeral 10. As FIGS. 1A–1D illustrate, each tide turbine 10 rotates on a shaft 12 having a vertical axis. As detailed below, typically a number of turbines 10 will be mounted on a common shaft which transmits the rotational force they develop to a generator 14 mounted above the water level. The tide turbines 10 are preferably formed of a durable plastic or corrosion-resistant metals such as aluminum or stainless steel for durability in sea water. They may be provided with antifouling coatings as known in the art. Preferably, the turbines 10 are at all times completely submerged underwater and operate on the flow of water on both the incoming tide and the outgoing tide. As shown, a number of turbine and generator assemblies may be used. Maintenance ladders are indicated at 15 (FIG. 1A). A flywheel (not shown) may be provided on the shaft 12 to keep generator 14 spinning during the period of the slack tide. A clutch (not shown) may be incorporated to allow the turbines to remain still during this period. In FIG. 1A the tide turbines 10 are shown positioned underneath an oil drilling platform 16, but their placement beneath a bridge, a causeway, a fishing dock, or any other sturdy structure that facilitates the use of the tide is within the scope of the invention.

Figure 1B:
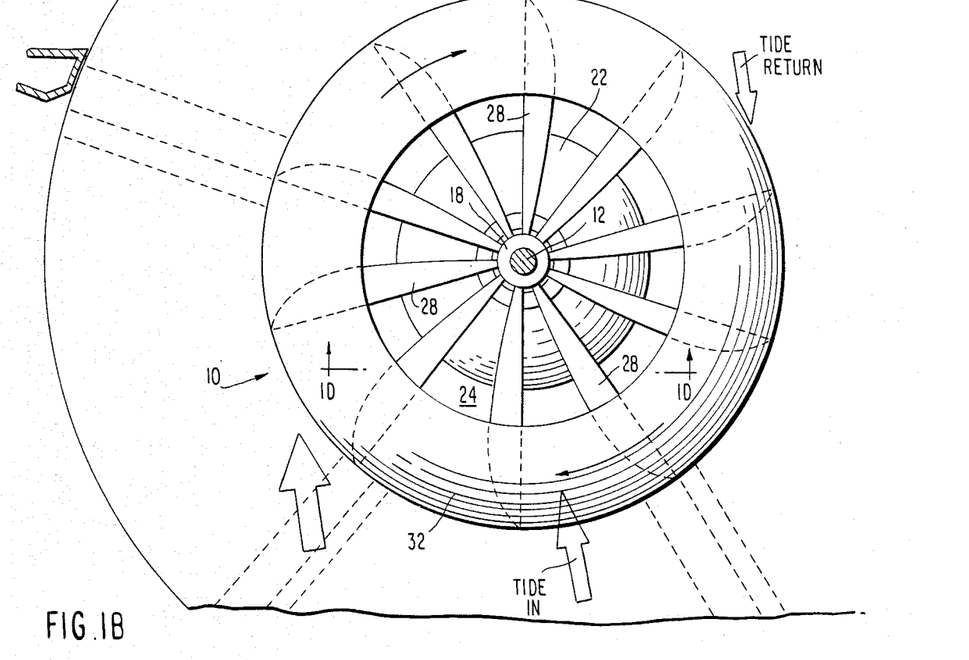
FIG. 1B is a detailed plan view of a first embodiment of the tide turbine of the present invention.
Figure 1C:
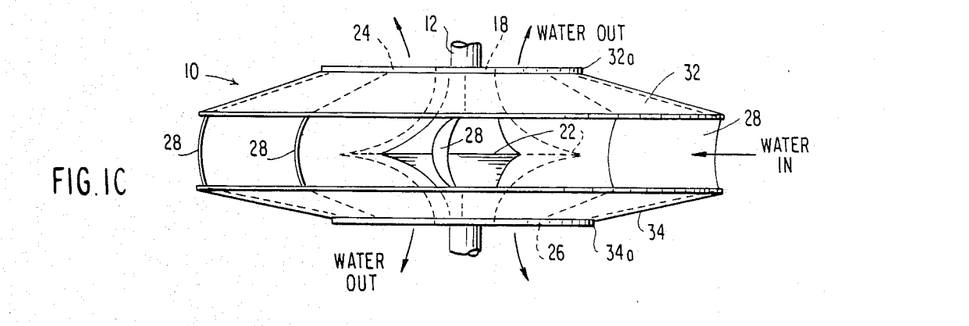
FIG. 1C is a side view of the turbine of the invention.
Figure 1D:
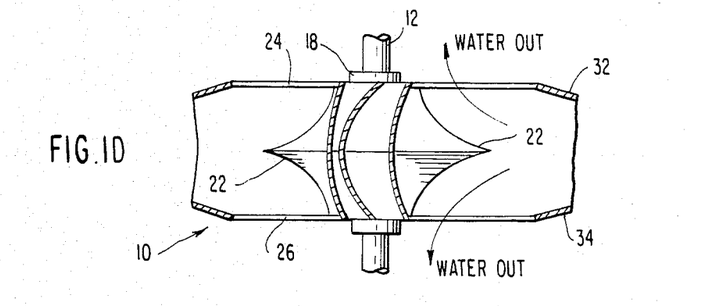
FIG. 1D is a sectional view taken along line 1D—1D in FIG. 1B.

Referring now more particularly to FIGS. 1B–1D, which show a single turbine 10, the tide turbine 10 rotates in the same direction (clockwise in FIGS. 1B–1C) when driven by either the incoming or outgoing tide. The turbine comprises a number of "scoops" 28 against which the flowing water entering from the periphery of the turbine "wheel" exerts a force, causing the turbine to rotate. The axially outer edges of the scoops 28 are shrouded by upper and lower ringlike disks 32 and 34, respectively; upper and lower axial outlets 24 and 26 in the centers of the disks 32 and 34, respectively, provide an "escape route" for the water as well as for any fish, etc., which may enter the turbine.

Preferably the outlets are ringed by upstanding shoulders or lips 32a and 34a which provide additional surface area against which the flowing water can exert force.

Disposed about central hub 18 is a divider 22 which rotates with the turbine and which splits the water as it passes by scoops 28. The divider 22 comprises mating curved surfaces. Sections through the divider 22 perpendicular to the shaft 12 are all circular, being of largest radius where the surfaces of the divider meet and smallest near the shaft, i.e. at its upper and lower ends. The water is split by divider 22 so that approximately half flows upwardly through the upper axial outlet 24 and half flows downwardly through the lower axial outlet 26. By splitting the water, the divider 22 prevents an unbalanced axial force from being exerted on the hub 18 in either direction. This simplifies the design of the bearings in which the turbine rotates, as well as that of the other supporting structure required.

The dividers may also have upstanding members formed on their surfaces, particularly near their portions of maximum radius, against which the flowing water can exert further force. These members are discussed below in connection with FIG. 4.

As mentioned, the tide turbine 10 includes an array of scoops 28 which extend radially from the hub 18. As shown in FIG. 1C, the scoops 28 have smooth inside walls and are concave on one side and convex on the other side, so as to have force exerted thereon by the incoming water, whereby the turbine is rotated as the water passes by toward the divider 22. In a typical arrangement, the scoops 28 may be 8 inches wide and 30 inches long, and their shape and the radius of the openings 24 and 26 is so as to thrust the water into the divider 22 and out through openings 24 and 26 at approximately twice the speed at which the water enters the space between the outer peripheral edges of scoops 28 and the disks 32 and 34.

As shown in FIG. 1B, the circular disks 32 and 34, which together with the scoops 28 and divider 22 define the water flow pathways, are generally frustoconical in shape to provide a smooth flow of water between the scoops and out along the axis of the turbine, and to provide the correct variation in cross-sectional area of the chambers formed between each of the scoops and the circular disks 32 and 34. In general, the water flow pathways decrease smoothly in cross sectional area from inlet to outlet in slope note #2. Water flowing through these passages, being incompressible, is accelerated. A force is thereby exerted on the turbine, causing it to be rotated.

Figure 2A:
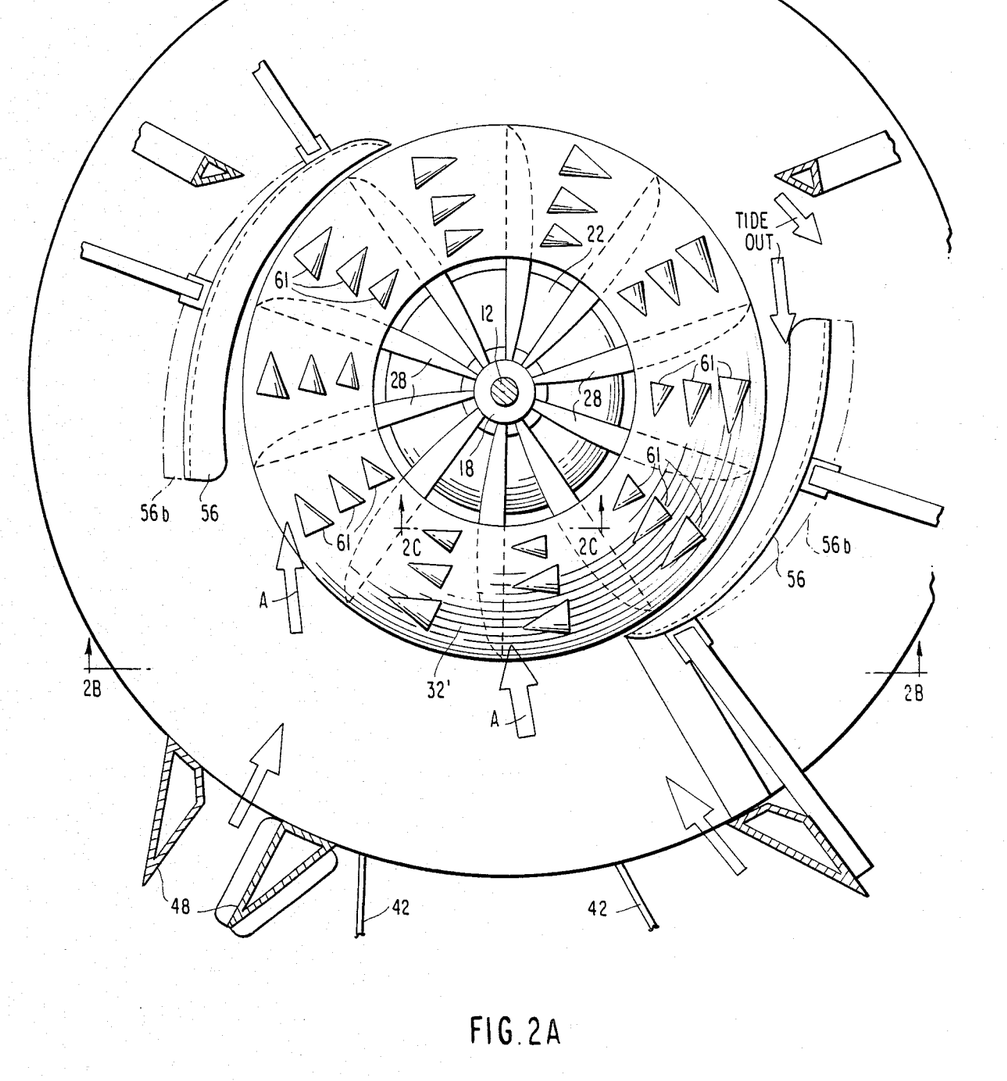
FIG. 2A is a top plan view of a second embodiment of the turbine according to the invention.
Figure 2B:
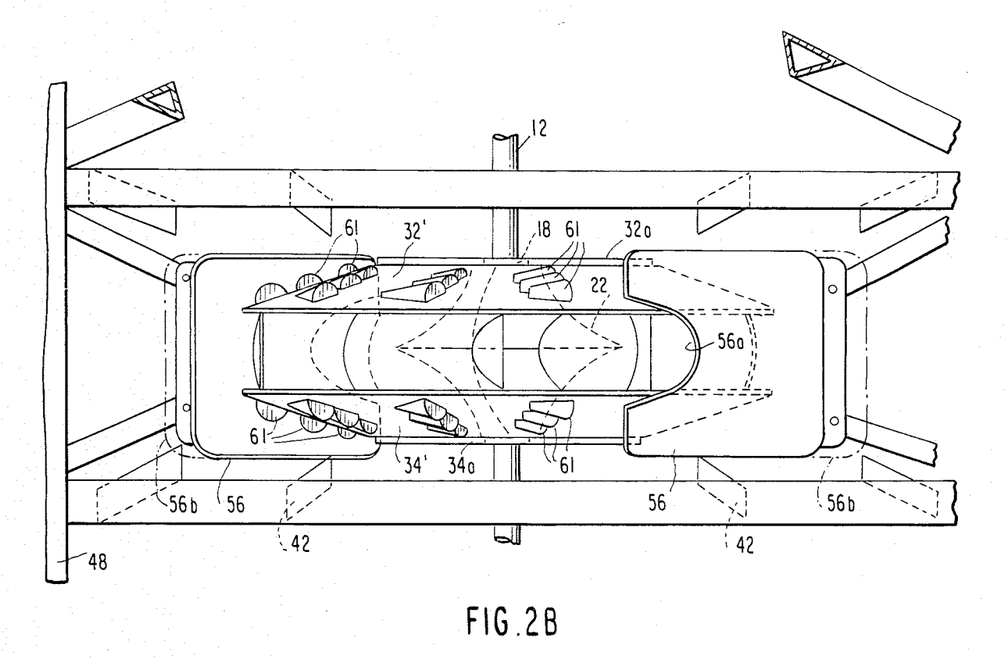
FIG. 2B is a side sectional view taken along line 2B—2B in FIG. 2A.
Figure 2C:
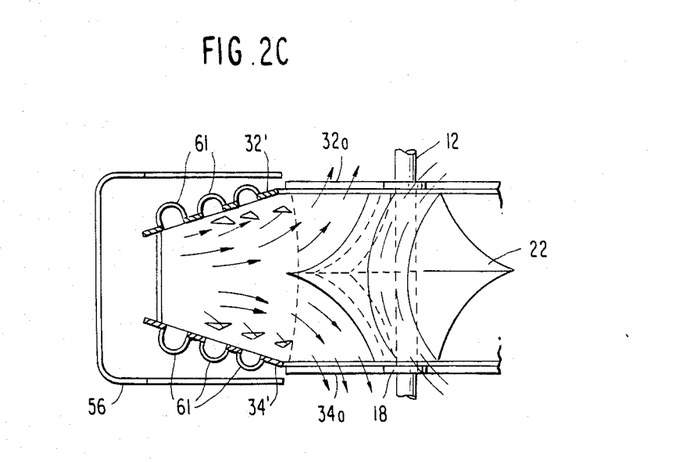
FIG. 2C is a sectional view taken along line 2C—2C in FIG. 2A.

FIGS. 2A–2C show, as mentioned, a somewhat different form of the turbine according to the invention, in which the upper and lower disks 32' and 34', instead of being smooth as in the embodiment of FIG. 1, are formed to comprise a number of conoids 61, which are indentations having a semi-circular face at one end, against which the flowing water exerts force. The disks again may comprise shoulders or lips 32a, 34a, as shown. The conoids 61 taper more or less to a point at their other end. The result is to provide an additional torque generation capability. The conoids 61 are readily visible in FIG. 2A. The conoids 61 provide resistance to the flow of water past the disks and should therefore aid in causing the turbine to rotate, thus improving the power generated, for a given flow of water. As shown, each of the conoids includes a generally flat reaction surface against which flow of water exerts force; the rear of the flat surface is faired into the major surface of the turbine wheel, so that a net rotational force is provided by water flow into and past the wheel. As also shown in FIG. 2B, the struts 48 which support the turbine assembly (detailed below in connection with FIG. 5) are preferably shaped as shown to control the water flow. Fin deflectors can also be provided at 42, to further channel the water flowing towards the turbine, and to prevent larger fish and the like from being caught in the turbine blades. The leading edges of the struts 48 are desirably relatively sharp to cut any floating debris or marine life which might otherwise tend to become tangled in the rotating turbines.

As shown, a pair of baffles 56 is desirably provided. Baffles 56 may also be used in connection with the other embodiments of the turbine of the invention.

Their function is to prevent water from impacting the "backs" of the scoops 28, e.g. on the right lower quadrant of the turbine wheel in FIG. 2A, when the current is flowing in the direction shown by the arrows A. Otherwise the rotation of the turbine 10 would be impeded. The baffles may desirably be controllably movable between the position shown in full at 56 and that shown in phantom at 56b, to "tune" the water flow characteristics.

FIG. 2B also shows a possible alternative shape of the baffle 56, which is generally C-shaped in cross-section, but which may have an indentation 56a at its central portion, to assist in deflecting flow of water into the turbine.

Figure 3A:
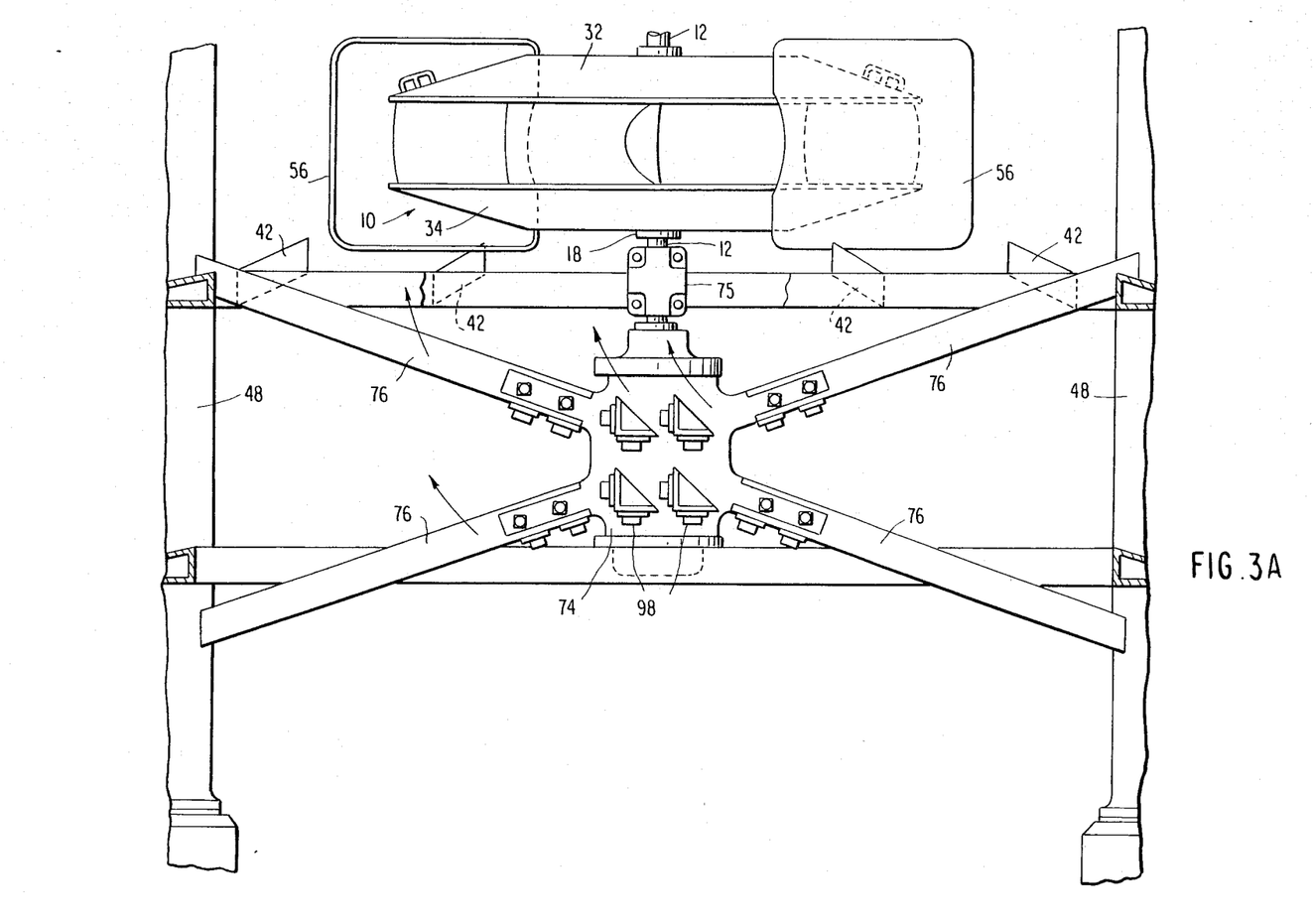
FIGS. 3A and 3B together show how a number of the turbines of the invention may be assembled for operation, with FIG. 3A depicting the lowermost turbine and the base of the assembly and FIG. 3B depicting an intermediate portion of the assembly.
Figure 3B:
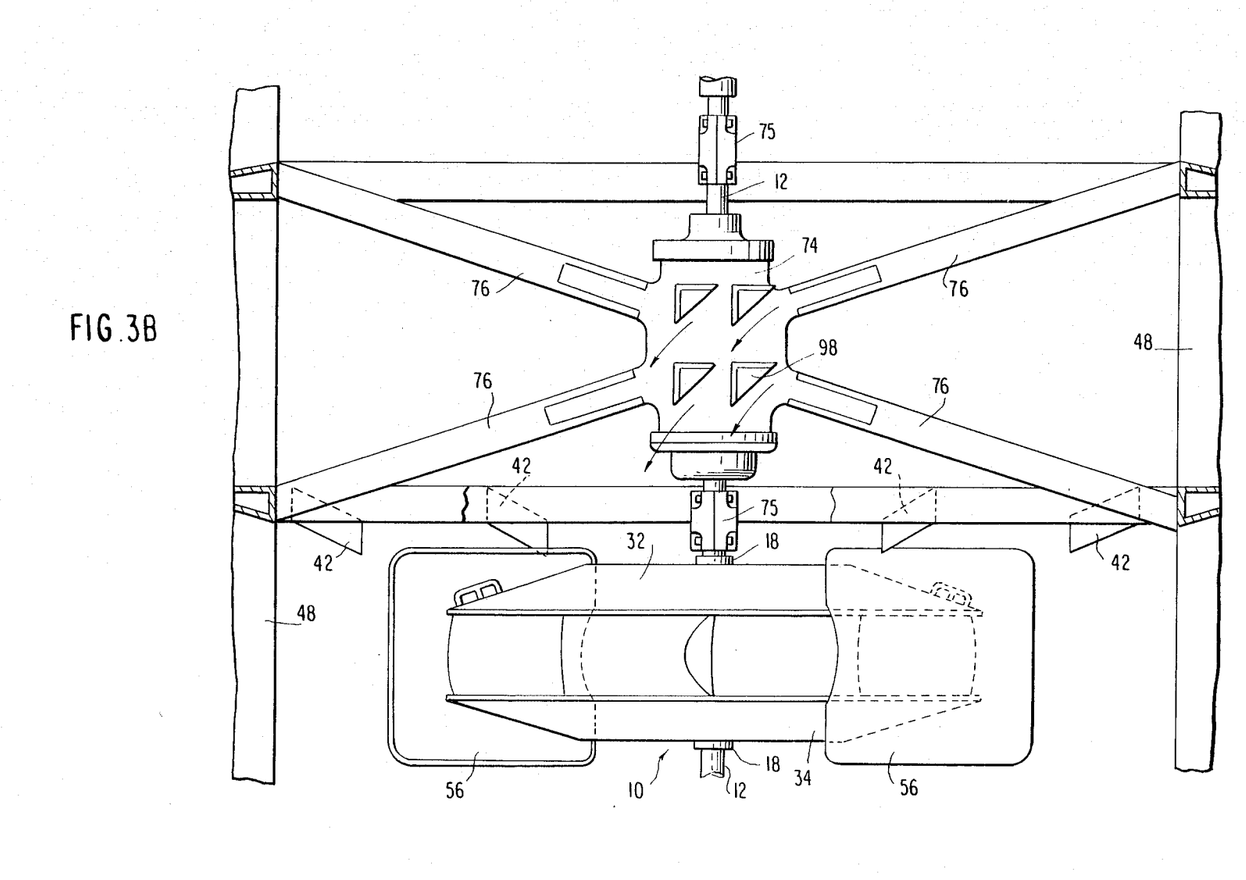

FIGS. 3A–3B show how a plurality of turbines according to the invention can be supported on a framework comprising uprights 48, as shown in cross-section in FIG. 2A. FIG. 3A shows the lowermost turbine of a group of turbines, preferably connected by a common shaft 12, and an exemplary base construction, while FIG. 3B shows a turbine located in an intermediate position. The disposition of plural turbines in juxtaposition to one another on a common shaft may further aid in obtaining useful energy from the flow of water. A number of X-shaped radial brace assemblies 76 provide stabilization for bearing housings 74. Bearing housings 74 carry elements of a common shaft 12 joined by couplings 75 in order to connect a number of turbines 10 according to the invention. Thus, a large number of turbines 10 can be mounted on essentially modularized bearing and brace sub-assemblies for convenient assembly. Their total output is effectively summed by the shaft 12 for supply to generators which sit on a platform well above water level, e.g. at 16 in FIG. 1; also note the discussion below in connection with FIG. 5. preferably, each bearing housing 74 is provided with tide deflectors 98 which serve to direct the water away from them and onto the turbines 10, thereby lowering the loading on the structure and increasing the efficiency of the turbines. Means may be provided for remotely monitoring the bearing temperature and for remote lubrication, both for convenience and timeliness of maintenance.

FIGS. 4A–4D show some variations on the shape of the scoops which may be employed. In this case it is desired that the turbine be rotated in a clockwise direction by a current which is moving in the reverse direction with respect to the embodiments of FIGS. 1–3, that is, as shown by the arrows B. In this case, the flow divider 22 is still shown, (see FIG. 4B) but riveted or otherwise affixed to the circular frustoconical disks 34 and 36 are a number of additional deflectors 68 which serve to derive additional power from the current.

Figure 4A:
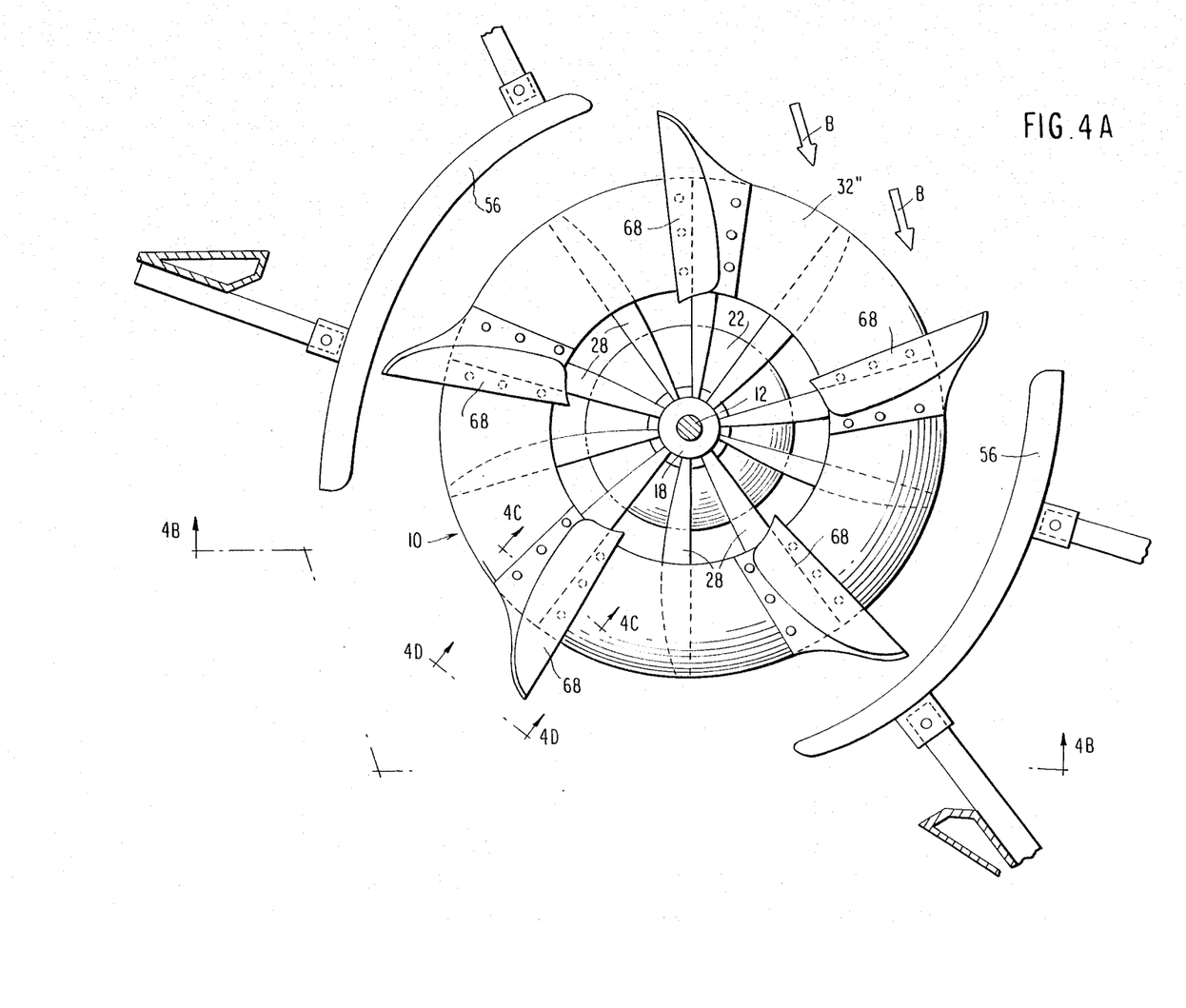
FIG. 4A shows a plan view of a somewhat different embodiment of the turbine according to the invention.
Figure 4B:
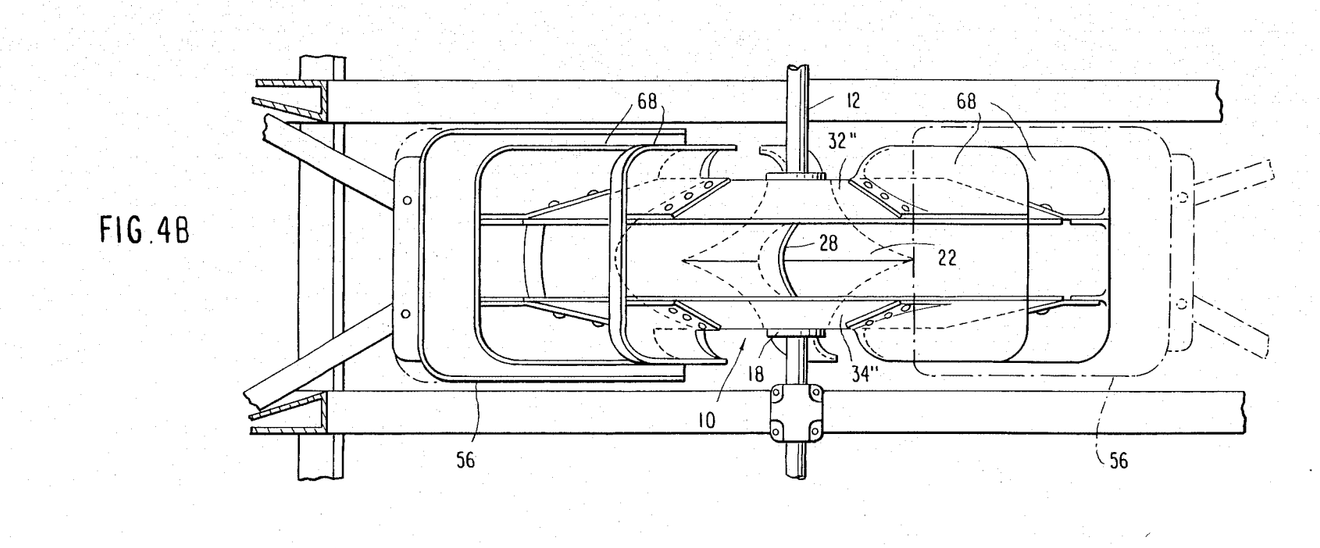
FIG. 4B is a side view taken along line 4B—4B in FIG. 4A.
Figure 4C:
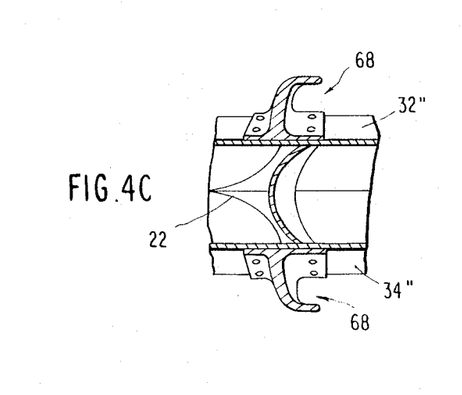
FIG. 4C is a cross-sectional view taken along line 4C—4C in FIG. 4A.
Figure 4D:
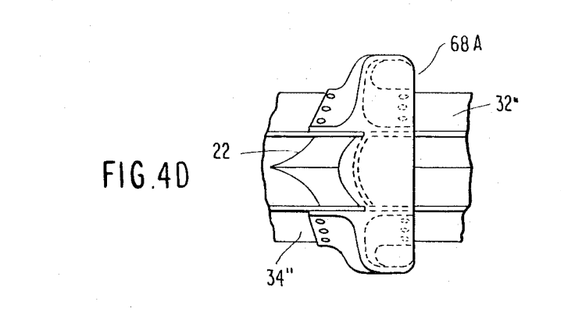
FIG. 4D is a second cross-sectional view taken along line 4D—4D of FIG. 4A.

These may be simply openended as shown at 68 in FIG. 4C, or they may have their ends closed as shown at 68A in FIG. 4D. FIG. 4D also shows in phantom conoids 22a formed on the flow divider 22, which may be provided in order to generate additional force. In this embodiment the flow divider rotates with the turbine wheel. Again the conoids comprise generally flat reaction surfaces perpendicular to the flow of water, for receiving rotational energy therefrom, the rear portions of the conoids serving to fair the flat surfaces into the generally smooth surface of the flow divider.

Figure 5:
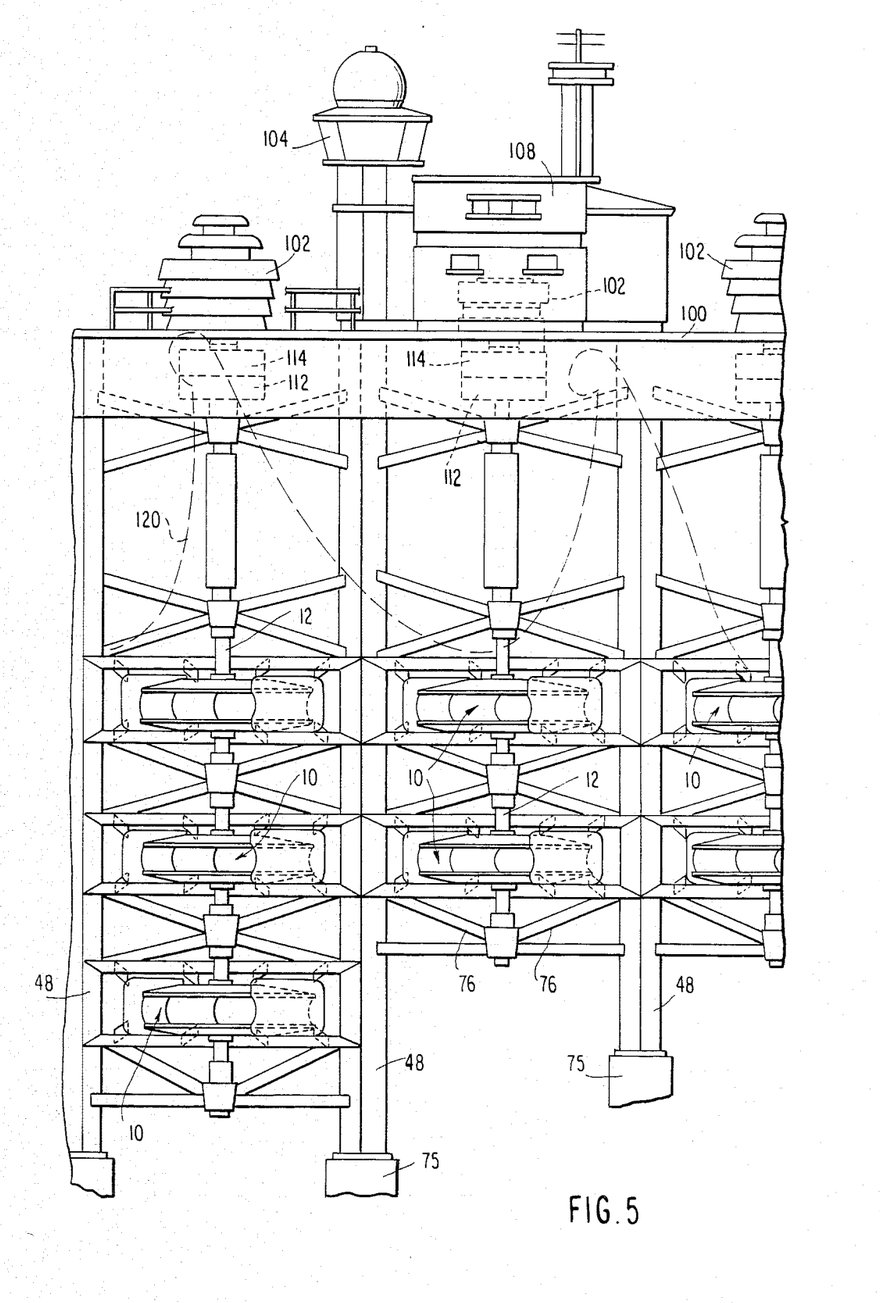
FIG. 5 shows an overall view of a turbine generating power station according to the invention in which tidal power is utilized to generate electric current.

FIG. 5 shows the overall configuration of a generating system according to the invention. A number of turbines 10 according to the invention are mounted on a structure made up of a number of the uprights 48 shown in FIG. 1, mounted on concrete piers 75 in the bottom of a channel through which oceanic tides flow. These uprights 48 generally are arranged in a grid pattern, such that the turbines are supported by struts 76 disposed on several sides of the turbines, for rigidity. It may be useful to heat the uprights in winter to prevent ice formation.

A platform 100 is mounted on the top of the uprights. Other parts of the system such as generators 102, observation platform 104, control room 108 and the like, may be mounted on platform 100. In one preferred embodiment, it is contemplated that platform 100 would comprise part of a causeway connecting two land masses separated by the body of water being tapped for power. One or more wind generators according to the inventor's U.S. Pat. No. 4,465,929 may be provided as well. The normal maximum tidal wave is shown in phantom at 120; as shown, the platform 100 is located above this height. Flywheels 114, planetary gearing, clutches and brakes, as needed, indicated generally at 112, may be disposed beneath the platform 100. The clutches can be used to disconnect the turbines from the generators during slack tides so that the flywheels can continue to rotate the generators at these times, and for repair. The planetary gearing allows the generators and fly wheels to spin faster than the turbines.

Preferably, the relative height of the turbine assembly is such that all of the turbines are under water at substantially all times, regardless of the state of the tide. As mentioned, flywheels can also be added to the shafts to ensure that the generators continue to spin, even during the slack tide. The number of turbines can be multiplied as desired.

As discussed above, the most desirable location for an electrical power generation tide turbine according to the invention is at a location where power demands are heavy and where the tides are strong. The coast of Maine is such a place; the huge metropolitan area extending from Washington, D.C. to Boston and beyond is accessible by power lines and provides ample electrical demand, while the tides between Maine and some of the islands of New Brunswick and Newfoundland are very high; the Bay of Fundy tides are the highest in the world.

The inventor has realized that the particularly advantageous location for a tide turbine might be in the channel separating Maine and Grand Manan Island, a distance of some nine miles in which the tides move at up to some 3.4 mph and have a variation of over 20 feet. At present Grand Manan is accessible from the mainland only by boat or helicopter. If a causeway were built connecting the two, the turbines according to the invention could very conveniently be supported therebeneath, as could generating equipmemt placed between the roadway and the banks of turbines in the water, as shown in FIG. 5. The flywheels mentioned above could also be provided on the various shafts 12 underneath the causeway. In this way, the structure required to support the turbines would do double duty, and would connect the relatively inaccessible Grand Manan Island with the mainland.

In this way power could be provided without combustion of nonrenewable resources and without requirement of construction of unsightly, dangerous, expensive and unpopular generating plants. Nor need the flow of the tides be significantly affected.

It will be apparent to those skilled in the art that numerous modifications and improvements can be made to the turbine and generating system of the invention. Therefore, the above exemplary disclosure should not be considered as a limitation on the scope of the invention, but only as an illustrative embodiment thereof.

I claim:

1. A turbine for generating rotational energy from water power, comprising a circular array of scoops affixed to a hub, said hub being journaled for rotation about a vertical axis, a pair of generally circular disks having shoulders top and bottom disposed about said hub and affixed to either side of said scoops to define chambers between adjacent ones of said scoops, said disks having circular openings therein disposed concentrically about their axes for egress of water from said chambers essentially along the axis of rotation of said hub, and baffle means positioned outside said turbine scoops and fixed with respect to said axis of rotation so as to prevent water flow into ones of said chambers located in predetermined ralation to said baffle means, whereby a net rotational force is imparted to said turbine when disposed in water flowing generally perpendicular to said vertical axis.

2. The turbine of claim 1 wherein flow divider means are disposed about said central hub, such that water flow out of said chambers takes place substantially uniformly in both directions axially along said shaft.

3. The turbine of claim 2 wherein said baffle means further comprise means for directing flow of water toward predetermined scoops of said turbine, whereby additional force is imparted to said turbine by water flow therearound.

4. A generating system, comprising a turbine mounted on a shaft having a vertical axis and journaled for rotation, a generator connected to said shaft, and means for supporting said turbine in flowing water, said turbine comprising a number of chambers defined by a plurality of radially extending scoops extending outwardly from the axis of said shaft, a pair of circular disk members with a shoulder disposed on either side of said plurality of scoops and being affixed thereto to form chambers therebetween, said chambers having peripheral openings for the ingress of water into said chambers and having water egress passages defined solely by openings in said disks along the axes of said shaft, and flow divider means disposed within each of said chambers to cause water to egress along the axis of the shaft substantially equally in both directions.

5. The system of claim 4 wherein baffle means are supported in juxtaposition to a number of said scoops of said turbine, such that water flow toward said turbine from a given direction is precluded from entering all of the chambers on the side of the turbine facing in that direction, such that a net rotational force is exerted on said turbine when water flow is incident thereon.

6. The system of claim 5 wherein a number of substantially identical turbine assemblies are provided, each being affixed to a shaft driving a generator.

7. The system of claim 6 wherein a number of turbines are joined by a common shaft connecting them to a generator.

8. The system of claim 6 wherein each of said generators is mounted above the water level.

9. The system of claim 6 wherein said turbines are supported and maintained in a defined array by a plurality of upright support members extending from foundations in a water course upwardly to a platform supporting said generators, said upright support members being hydrodynamically shaped to channel water flow into said turbines.

10. An improved turbine for use in generating electrical power from water flowing in a given direction, said turbine comprising a turbine wheel mounted for rotation about an axis and comprising a number of scoops disposed between upper and lower disks to define chambers, said chambers having orifices at the periphery of said wheel for ingress of water into said chambers, said chambers being provided with egress apertures in said disks for axial egress of water from said chambers, said scoops being shaped such that water flow through said chambers causes a net rotational force to be exerted on said turbine wheel, and wherein said disks comprise generally flat major surfaces and reaction surface means upstanding therefrom formed such that water flowing thereagainst exerts a rotational force on said wheel.

11. The turbine of claim 10 wherein said reaction surface means comprised by said disks each comprise a generally flat surface perpendicular to the direction of said water flow.

12. The turbine of claim 11 wherein said disks further comprise means for fairing said generally flat reaction surfaces into the major surfaces of said disks.

13. The turbine of claim 12 wherein each turbine wheel further comprises flow divider means for ensuring that water egress from the interior of said chambers is substantially equal in both directions along said axis.

14. The turbine of claim 13 wherein said flow divider means rotates with said turbine wheel and comprises reaction surface means adapted to derive a net rotational force responsive to flow of water over said flow divider means.

15. The turbine of claim 14 wherein said flow divider means has a generally smooth major surface and each said reaction surface means has a surface generally perpendicular to the flow of water in said given direction.

16. The turbine of claim 15 wherein each said reaction surface means is faired into said major surface of said flow divider.

17. The turbine of claim 10 wherein the axis of said turbine is substantially vertical.

18. The turbine of claim 10 wherein the cross-sectional area of said chambers generally perpendicular to the direction of water flow decreases generally continually from said orifices at the periphery of said wheel for ingress of water into said chambers to said apertures in said disks for axial egress of water from said chambers.

19. The turbine of claim 10 in combination with baffle means for preventing water flowing onto said combination from flowing against portions of said wheel.

20. In combination:
a number of turbines mounted for common rotation on a number of vertically extending shafts, each of said turbines comprising a circular array of scoops disposed between circular upper and lower disks to define chambers having peripheral openings for entry of water thereinto, said disks being provided only with axial apertures to define axial passages for water egress from said chambers;
a number of generators mounted to be driven by said shafts; and
support structure for supporting said turbines in the water of a tidal channel and said generators above the water in said channel, said support structure extending between land masses on either side of said tidal channel and comprising causeway means for vehicular traffic thereover.

21. The combination of claim 20 wherein a flywheel is mounted on each of said vertically extending shafts.

22. The combination of claim 20 wherein planetary gear means is interposed between said vertically extending tending shafts and said generators, whereby said turbines spin at a lower rate of revolution than said generators.

23. The combination of claim 20 further comprising clutch means for disconnection of said turbines from said generators.

24. The combination of claim 20 further comprising brake means for preventing rotation of said generators.

* * * * *